United States Patent
Takeda et al.

(10) Patent No.: US 11,838,933 B2
(45) Date of Patent: Dec. 5, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Qin Mu, Beijing (CN); Liu Liu, Beijing (CN); Chongning Na, Beijing (CN); Xin Wang, Beijing (CN); Jing Wang, Beijing (CN); Lihui Wang, Beijing (CN); Min Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/494,440

(22) PCT Filed: Mar. 17, 2017

(86) PCT No.: PCT/JP2017/010986
§ 371 (c)(1),
(2) Date: Sep. 16, 2019

(87) PCT Pub. No.: WO2018/167959
PCT Pub. Date: Sep. 20, 2018

(65) Prior Publication Data
US 2021/0120557 A1 Apr. 22, 2021

(51) Int. Cl.
*H04W 72/04* (2023.01)
*H04W 72/12* (2023.01)
(Continued)

(52) U.S. Cl.
CPC .......... *H04W 72/53* (2023.01); *H04L 1/1819* (2013.01); *H04L 5/0055* (2013.01); *H04W 24/08* (2013.01);
(Continued)

(58) Field of Classification Search
None
See application file for complete search history.

(56) References Cited

U.S. PATENT DOCUMENTS

2011/0228731 A1 9/2011 Luo et al.
2012/0294204 A1* 11/2012 Chen .................... H04L 5/0053
370/280
(Continued)

FOREIGN PATENT DOCUMENTS

JP 2013-506386 A 2/2013

OTHER PUBLICATIONS

Nilsson et al., Transmission of control information using more than one beam pair link, Nov. 4, 2016, U.S. Appl. No. 62/417,633, filed 2016.*

(Continued)

*Primary Examiner* — The Hy Nguyen
(74) *Attorney, Agent, or Firm* — Osha Bergman Watanabe & Burton LLP

(57) ABSTRACT

The present invention is designed to appropriately select PUCCH resources used to transmit HARQ-ACK. According to one aspect of the present invention, a user terminal has a control section that monitors candidate resources of one or more downlink (DL) control channels (DL) transmitted in multiple different time and/or frequency resources, and detects one or more downlink control information (DCI), and a transmission section that transmits delivery acknowledgment information in response to a downlink (DL) data channel by using an uplink (UL) control channel, and the control section selects resources for the UL control channel based on the DCI.

5 Claims, 15 Drawing Sheets

(51) Int. Cl.
  *H04W 72/53* (2023.01)
  *H04L 1/1812* (2023.01)
  *H04L 5/00* (2006.01)
  *H04W 24/08* (2009.01)
  *H04W 72/0446* (2023.01)
  *H04W 72/0453* (2023.01)
  *H04W 72/23* (2023.01)

(52) U.S. Cl.
  CPC ... *H04W 72/0446* (2013.01); *H04W 72/0453* (2013.01); *H04W 72/23* (2023.01)

(56) References Cited

U.S. PATENT DOCUMENTS

| | | | | |
|---|---|---|---|---|
| 2013/0010619 A1* | 1/2013 | Fong | H04W 72/0453 | 370/252 |
| 2013/0058240 A1* | 3/2013 | Kim | H04L 5/0053 | 370/252 |
| 2013/0188590 A1* | 7/2013 | Aiba | H04L 5/0053 | 370/329 |
| 2014/0064233 A1* | 3/2014 | Oizumi | H04L 1/1854 | 370/329 |
| 2015/0173063 A1* | 6/2015 | Oizumi | H04L 1/1678 | 370/242 |
| 2016/0270066 A1* | 9/2016 | Seo | H04W 72/0413 | |
| 2017/0019216 A1* | 1/2017 | Li | H04W 4/70 | |
| 2017/0295006 A1* | 10/2017 | Han | H04L 5/0055 | |
| 2018/0145796 A1* | 5/2018 | Liang | H04L 1/1861 | |
| 2018/0198594 A1* | 7/2018 | Tiirola | H04W 74/006 | |
| 2019/0007959 A1* | 1/2019 | Hwang | H04W 72/0446 | |
| 2019/0132834 A1* | 5/2019 | Yan | H04W 72/0413 | |
| 2019/0230644 A1* | 7/2019 | Cheng | H04L 5/0055 | |
| 2020/0008231 A1* | 1/2020 | Vilaipornsawai | H04W 72/1273 | |
| 2020/0221427 A1* | 7/2020 | Nilsson | H04W 48/12 | |

OTHER PUBLICATIONS

Daesun Hwang, DL control channel for dynamic information size, Nov. 1, 2016 (Year: 2016).*
Vilaipornsawai et al., Downlink Control Information for Network Coordination Schemes (U.S. Appl. No. 62/454,603), filed Feb. 3, 2017 (Year: 2017).*
International Search Report issued in PCT/JP2017/010986 dated May 30, 2017 (2 pages).
Written Opinion of the International Searching Authority issued in PCT/JP2017/010986 dated May 30, 2017 (4 pages).
ETSI TS 136 300 V8.12.0; "LTE; Evolved Universal Terrestrial Radio Access (E-UTRA) and Evolved Universal Terrestrial Radio Access Network (E-UTRAN); Overall description; Stage 2 (3GPP TS 36.300 version 8.12.0 Release 8)"; Apr. 2010; (153 pages).
Office Action issued in Japanese Application No. 2019-505657; dated Jun. 1, 2021 (6 pages).

* cited by examiner

| PREDETERMINED FIELD VALUE IN DCI | PUCCH RESOURCE |
|---|---|
| 00 | PUCCH RESOURCE #1 |
| 01 | PUCCH RESOURCE #2 |
| 10 | PUCCH RESOURCE #3 |
| 11 | PUCCH RESOURCE #4 |

FIG. 4

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "NR (New Radio)," "NX (New radio access)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CCs) is introduced in order to achieve broadbandization. Every CC is formed using the system bandwidth of LTE Rel. 8 as 1 unit. In addition, in CA, multiple CCs under the same radio base station (also referred to as "eNB (eNodeB)") are configured in a user terminal (also referred to as "UE (User Equipment)").

Meanwhile, in LTE Rel. 12, dual connectivity (DC), in which multiple cell groups (CGs), formed by different radio base stations, are configured in UE, is also introduced. Every cell group is comprised of at least one cell (or CC). Given that multiple CCs of different radio base stations are aggregated in DC, DC is also referred to as "Inter-base station CA (Inter-eNB CA)" and the like.

In existing LTE systems (for example, LTE Rel. 8 to 13), a user terminal receives downlink control information (DCI) via a downlink (DL) control channel (for example, PDCCH (Physical Downlink Control CHannel), EPDCCH (Enhanced Physical Downlink Control CHannel), MPDCCH (Machine-type communication (MTC) Physical Downlink Control CHannel), etc.). Based on this DCI, the user terminal receives DL data channels (for example, PDSCH (Physical Downlink Shared CHannel)) and/or transmits UL data channels (for example, PUSCH (Physical Uplink Shared CHannel)).

Also, in existing LTE systems (for example, LTE Rel. 8 to 13), a user terminal transmits delivery acknowledgment information (also referred to as "HARQ-ACK (Hybrid Automatic Repeat reQuest-ACKnowledgement)," "ACK/NACK (ACKnowledgement/Negative-ACKnowledgement," "A/N," etc.)) in response to the PDSCH by using a UL control channel (for example, PUCCH (Physical Uplink Control CHannel)) or a UL data channel.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

Envisaging future radio communication systems (for example, 5G, NR, etc.), research is underway to use higher frequency bands (for example, 3 to 40 GHz) than existing frequency bands, in order to achieve high speeds and large capacity (for example, as in enhanced mobile broad band (eMBB). In general, higher frequency bands suffer greater distance-induced attenuation, and this makes it difficult to ensure coverage. Therefore, studies on MIMO (also referred to as "Multiple Input Multiple Output," "Massive MIMO," and so on), which uses a large number of antenna elements, are underway.

In MIMO, which uses a large number of antenna elements, it is possible to form beams (antenna directivities) by controlling the amplitude and/or the phase of signals transmitted or received via each antenna element (this is referred to as "BeamForming (BF)"). For example, when antenna elements are arranged two-dimensionally, the higher the frequency, the greater the number of antenna elements that can be arranged in a predetermined area. When the number of antenna elements in a given area increases, the beam width narrows (becomes narrower), so that the beamforming gain increases. Therefore, when beamforming is used, propagation loss (path loss) can be reduced, and coverage can be ensured even in high frequency bands.

Meanwhile, when beamforming is employed (for example, when it is likely that narrower beams are used in higher frequency bands), the quality of beams might drop and/or the links might break due to obstacle-induced blockage, and these might cause a drop in system performance.

Therefore, research is underway to transmit one or more DL control channels (also referred to as "NR-PDCCH," "PDCCH," etc.) by using multiple time and/or frequency resources (one or more beams) that vary to reserve the robustness of these DL control channels. However, when one or more DL control channels are transmitted by using multiple different time and/or frequency resources (one or more beams), a user terminal may not be able to select, properly, which resources (PUCCH resources) should be used for the UL control channel for use for transmitting HARQ-ACKs.

The present invention has been made in view of the above, and it is therefore an object of the present invention to provide a user terminal and a radio communication method, whereby resources for a UL control channel that is used to transmit HARQ-ACKs may be selected properly.

Solution to Problem

According to one aspect of the present invention, a user terminal has a control section that monitors candidate resources of one or more downlink (DL) control channels (DL) transmitted in multiple different time and/or frequency resources, and detects one or more downlink control information (DCI), and a transmission section that transmits delivery acknowledgment information in response to a downlink (DL) data channel by using an uplink (UL) control channel, and the control section selects resources for the UL control channel based on the DCI.

Advantageous Effects of Invention

According to the present invention, a user terminal can properly select resources for a UL control channel that is used to transmit HARQ-ACKs.

BRIEF DESCRIPTION OF DRAWINGS

FIG. 4 is a diagram to show an example of how to select PUCCH resources, according to a first example of the present invention;

DESCRIPTION OF EMBODIMENTS

Figure 1:
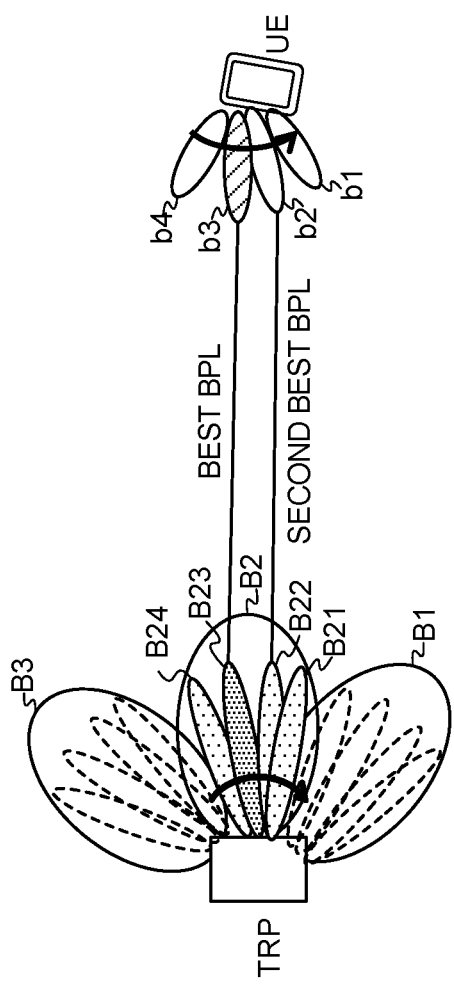
FIG. 1 is a diagram to show examples of BPLs.

Future radio communication systems (for example, 5G, NR, etc.) presume use cases characterized by, for example, high speed and large capacity (for example, eMBB), a very large number of terminals (for example, massive MTC (Machine-Type Communication)), ultra-high reliability and low latency (for example, URLLC (Ultra-Reliable and Low-Latency Communications)), and so on. Assuming these use cases, for example, studies are in progress to communicate by using beamforming (BF) in future radio communication systems.

Beamforming (BF) includes digital BF and analog BF. Digital BF refers to the method of performing precoding signal processing on the baseband (for digital signals). In this case, inverse fast Fourier transform (IFFT)/digital-to-analog converter (DAC)/RF (Radio Frequency) need to be carried out in parallel processes, as many as the number of antenna ports (RF chains). Meanwhile, it is possible to form a number of beams to match the number of RF chains, at any given timing.

Analog BF refers to the method of using phase shifting devices on RF. In this case, since it is only necessary to rotate the phase of RF signals, analog BF can be implemented with simple and inexpensive configurations, but it is still not possible to form a plurality of beams at the same time. To be more specific, when analog BF is used, each phase shifting device can only form one beam at a time.

Consequently, if a radio base station (referred to as, for example, a "gNB (gNodeB)," a "transmission and reception point (TRP)," an "eNB (eNode B)," a "base station (BS)" and so on) has only one phase shifter, the radio base station can only form one beam at any given time. Therefore, when multiple beams are transmitted using analog BF alone, these beams cannot be transmitted simultaneously using the same resource, and the beams need to be switched, rotated and so on, over time.

Note that it is also possible to adopt a hybrid BF design that combines digital BF and analog BF. Although, for future radio communication systems (for example, 5G, NR, etc.), studies are under way to introduce MIMO (for example, massive MIMO), which uses a large number of antenna elements, attempting to form an enormous number of beams using digital BF alone might lead to expensive circuit structures. Consequently, there is a possibility that hybrid BF will be used in future radio communication systems.

In the event BF (including digital BF, analog BF, hybrid BF, etc.) such as described above is used (for example, when it is likely that narrower beams are used in higher frequency bands), the quality of beams (for example, at least one of received power (for example, reference signal strength indicator (RSSI) and/or reference signal received power (RSRP), etc.), and/or the received quality (for example, received signal to noise ratio (SNR (Signal to Noise Ratio)), signal-to-interference plus noise power ratio (SINR)) and reference signal received quality (RSRQ)) might drop, and/or the links might break, due to obstacle-induced blockage and the like, and these might cause a drop in system performance. Therefore, in order to reserve the robustness of beams, research is also underway to allow a user terminal to monitor one or more DL control channels (also referred to as "NR-PDCCHs" and the like), transmitted in different time and/or frequency resources, by using multiple beams (or beam pair links).

Here, a beam pair link (BPL) refers to a pair of a beam that is used to transmit a signal (also referred to as a "transmitting beam," a "Tx beam," etc.) and a beam that is used to receive the signal (also referred to as a "receiving beam," an "Rx beam," etc.). For example, one or more Tx beams to use to transmit a DL control channel may be selected based on mobility (RRM (Radio Resource Management)) measurement results and/or channel state information (CSI) measurement results.

FIG. 1 is a diagram to show examples of BPLs. For example, referring to FIG. 1, a radio base station transmits signals for mobility measurements (mobility measurement signals) by using one or more beams (here, B1 to B3). Here, the mobility measurement signals are signals based on at least one of a primary synchronization signal (PSS), a secondary synchronization signal (SSS), a broadcast channel (PBCH (Physical Broadcast CHannel)), a mobility reference signal (MRS), a channel state information reference signal (CSI-RS). The mobility reference signal may be referred to as a "synchronization signal (SS) block," an "MRS," a "CSI-RS," a "beam-specific signal," a "cell-specific signal," and so on.

Referring to FIG. 1, a user terminal measures the received power (for example, RSSI and/or RSRP) and/or the received quality (for example, at least one of RSRQ, SNR and SINR, etc.) of the mobility measurement signals associated with beams B1 to B3. The user terminal transmits one or more beam indicators (also referred to as "beam IDs," "beam indices (BIs)," etc.) and/or a measurement report (MR) to show the measurement results, to the radio base station. Alternatively, the user terminal may transmit one or more beam pair link indicators (also referred to as "beam pair link IDs," "BPLIs," "BPLIDs," etc.) and/or a measurement report (MR) to show the measurement results, to the radio base station.

Based on this measurement report, the radio base station may select Tx beams B21 to B24 for use for communicating data or communicating control signals with the user terminal. The user terminal may measure K CSI-RS resources #1 to #4 that are associated with Tx beams B21 to B24 (or BPL composed of Rx beams respectively corresponding to Tx beams), and generate one or more CSI reports based on the measurement results. Here, a CSI-RS resource is, for example, at least one of a resource for a non-zero-power (NZP-) CSI-RS and a resource for a zero-power (ZP-) CSI-RS for interference measurement (IM). Where one or more CSI-RS resources are configured, the user terminal measures CSI for each CSI process. In other words, a CSI-RS resource is a CSI-RS (including a NZP-CSI-RS, a ZP-CSI-RS, etc.) that is transmitted using that CSI-RS resource.

Here, a CSI report which the user terminal generates may include at least one of a channel quality indicator (CQI), a precoding matrix indicator (PMI), a rank indicator (RI), and a CSI-RS resource indicator (CRI). As mentioned earlier, Tx beams are associated with CSI-RS resources, so that it is possible to say that a CRI specifies a Tx beam.

In FIG. 1, the user terminal may select N (N≤K) Tx beams or BPLs, and report CSI for these Tx beams or BPLs, to the radio base station. Furthermore, the user terminal may specify beam pair links (BPLs) by determining which Rx beams are suitable for each Tx beam selected. For example, in FIG. 1, Tx beam B23 and Rx beam b3 are selected as the best BPL, and Tx beam B22 and Rx beam b2 are selected as the second best BPL. The user terminal may report one or more BPLs that are selected, to the radio base station. Note that the BPLs may be selected in the radio base station and reported to the user terminal through higher layer signaling, MAC signaling and the like.

The radio base station transmits NR-PDCCHs by using M (M≥1) Tx beams (or Tx beams corresponding to M BPLs) that are selected, based on a CSI report from the user terminal. The user terminal may monitor (blind-decode) the NR-PDCCH in at least one of M BPLs. Here, the maximum value of M may be determined based on the capability of the user terminal. Note that the user terminal may monitor one or more NR-PDCCHs by using one or more Tx beams instead of one or more BPLs. In the following description, a "beam" will refer collectively to a Tx beam and/or an Rx beam, a BPL, and so on.

As described above, a user terminal may monitor NR-PDCCHs in one or more beams, by using one or more time resources and/or frequency resources. Also, the user terminal may monitor the NR-PDCCH of a certain beam in a shorter cycle than other beams. Also, NR-PDCCH monitoring spanning multiple time resources may be employed if the user terminal does not have multiple RF chains (antenna ports).

Here, one or more slots (or mini-slots), one or more symbols and the like may be used as time resources. Also, as for frequency resources, one or more resource blocks (RBs), one or more resource element groups (REGs), one or more REG groups, one or more control channel elements (CCEs) and so forth may be used. Here, an REG group is comprised of multiple REGs. An REG is comprised of multiple resource elements (RE). An RE is comprised of 1 symbol and 1 subcarrier.

Also, NR-PDCCHs to be monitored in one or more beams may be divisions of a single NR-PDCCH, or may be the same NR-PDCCH that recurs. Now, how one or more NR-PDCCHs are monitored in multiple beams will be described below, in detail, with reference to FIG. 2 and FIG. 3. Note that, although the beams shown in FIG. 2 and FIG. 3 are assumed to be Tx beams, obviously, these beams may be BPLs comprised of these Tx and Rx beams (not shown).

Figure 2A:
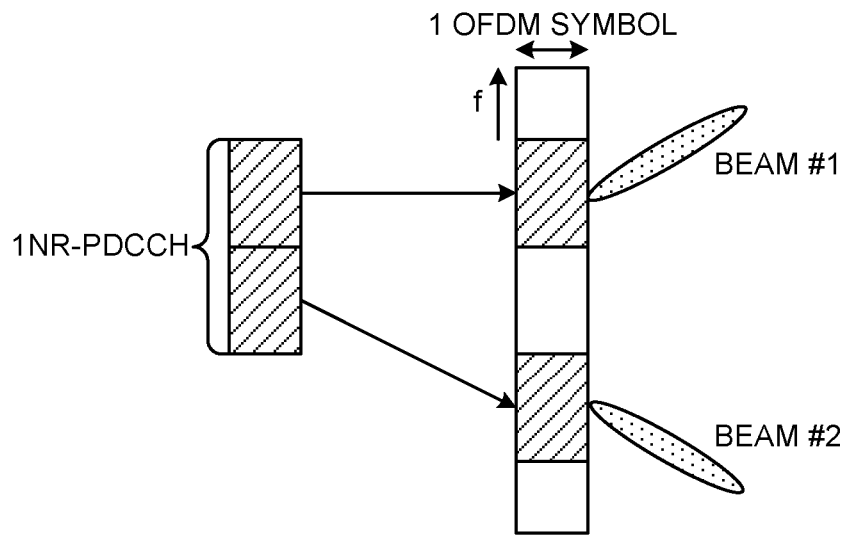
FIGS. 2A and 2B are diagrams to show examples of NR-PDCCH monitoring.
Figure 2B:
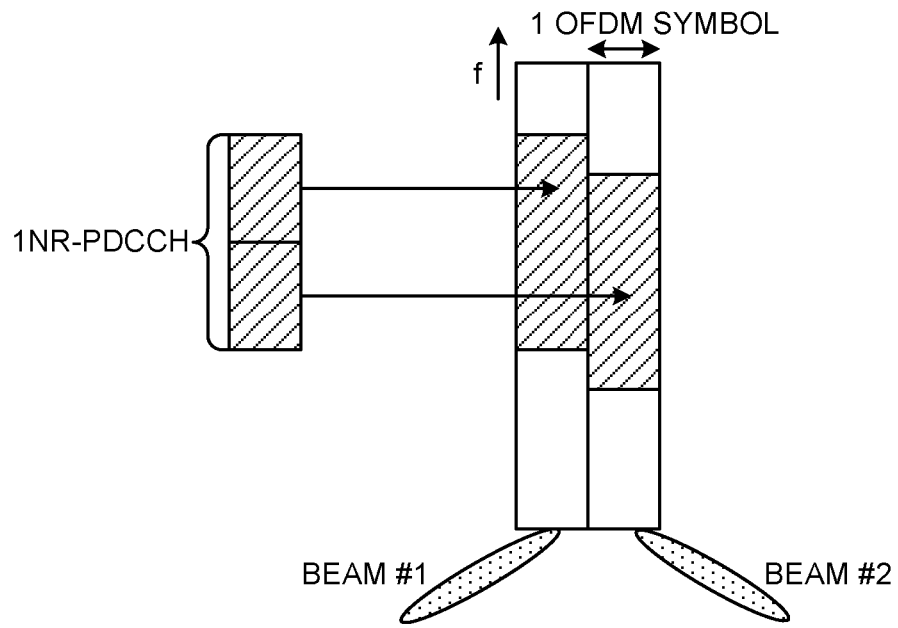

FIG. 2 are diagrams to show examples of NR-PDCCH monitoring. In FIG. 2, encoded data of a single NR-PDCCH (DCI) is divided into multiple pieces of encoded data (also referred to as "divisions of data"), and multiple divisions of data are transmitted using multiple varying beams. For example, FIGS. 2A and 2B show examples in which a single NR-PDCCH is formed with two divisions of data.

In FIG. 2A, two divisions of data are mapped to different frequency resources of the same time resource (here, 1 OFDM symbol) and transmitted using different beams #1 and #2, respectively. By contrast with this, in FIG. 2B, two divisions of data are mapped to different frequency resources of different time resource (here, 2 OFDM symbols) and transmitted using different beams #1 and #2, respectively.

As shown in FIGS. 2A and 2B, assuming that a single NR-PDCCH is monitored in M beams, if the coding rate of the NR-PDCCH is 1/M or less, theoretically, the user terminal can restore the NR-PDCCH by detecting one division of data among M beams.

Figure 3A:
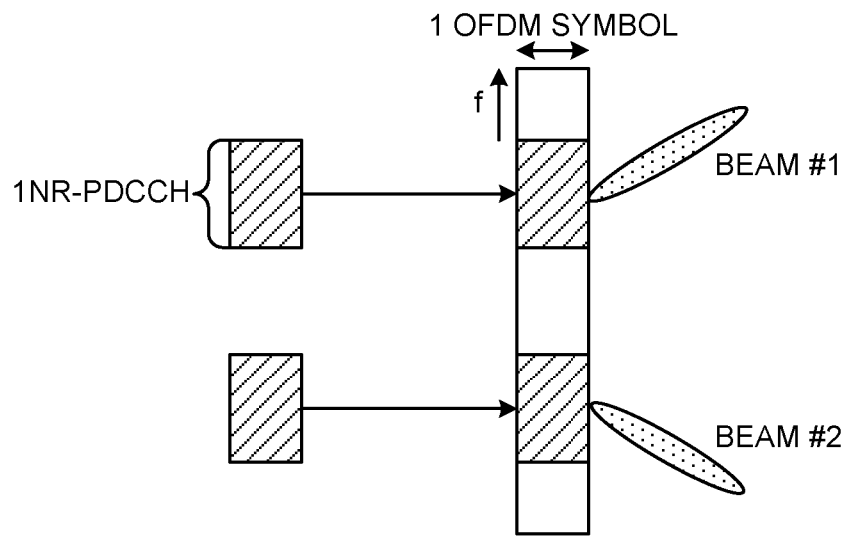
FIGS. 3A and 3B are diagrams to show other examples of NR-PDCCH monitoring.
Figure 3B:
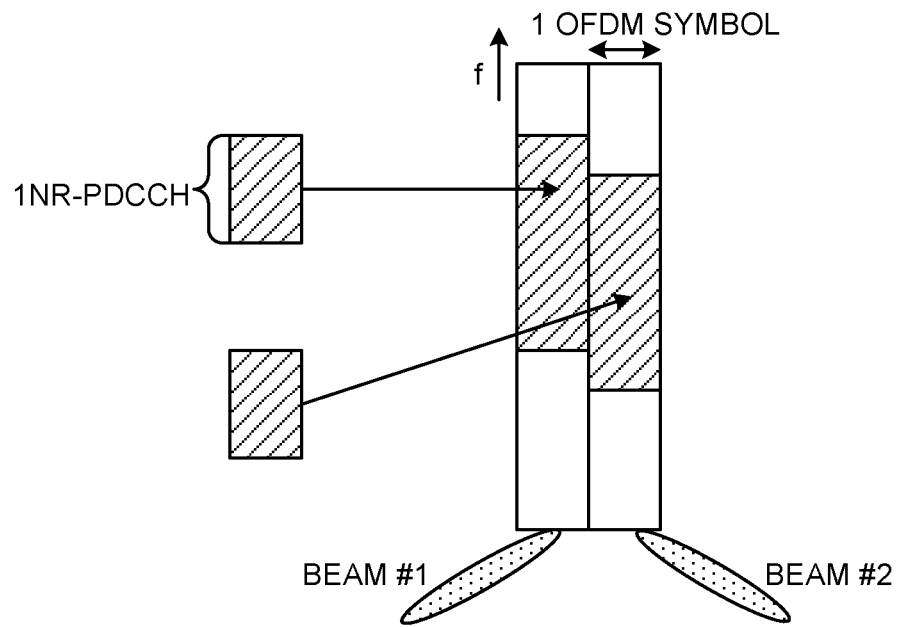

FIG. 3 are diagrams to show other examples of NR-PDCCH monitoring in multiple beams. In FIG. 3, the same NR-PDCCH (DCI) is repeated, and multiple repeating NR-PDCCHs (DCI) are transmitted using multiple varying beams. In repetition, DCI before error correction coding (after CRC bits are attached) is duplicated, each duplicate is subject to error correction coding, rate matching, data modulation and so on, an NR-PDCCH is generated based on each, and each NR-PDCCH may be transmitted using different beams, or an NR-PDCCH generated through error correction, rate matching, data modulation and the like may be duplicated, and each duplicate may be transmitted using a different beam. For example, FIGS. 3A and 3B show examples in which 2 NR-PDCCHs of the same contents are transmitted.

In FIG. 3A, 2 NR-PDCCHs of the same contents are mapped to different frequency resources of the same time resource (here, 1 OFDM symbol) and transmitted using different beams #1 and #2, respectively. In FIG. 3B, these 2 NR-PDCCHs are mapped to different frequency resources of different time resources (here, 2 OFDM symbols) and transmitted using different beams #1 and #2, respectively.

As shown in FIGS. 3A and 3B, when multiple repeating NR-PDCCHs are monitored in M beams, these multiple NR-PDCCHs may be allocated to different candidate resources (also referred to as "NR-PDCCH candidates," "PDCCH candidates," "candidates," etc.) in the same search space, or allocated to candidate resources in different search spaces. These NR-PDCCH candidates are comprised of one or more resource units (for example CCEs, REGs, REG groups, etc.) based on aggregation levels.

As shown in FIGS. 3A and 3B, when multiple repeating NR-PDCCHs are monitored in M beams, the user terminal can restore the NR-PDCCH by detecting one of the M beams. When detecting multiple beams, the user terminal may combine multiple NR-PDCCHs.

Note that multiple repeating NR-PDCCHs can be transmitted in the same beam as well. When multiple repeating NR-PDCCHs are transmitted in the same beam, channel estimation values obtained by using reference signals (RSs) respectively corresponding to multiple NR-PDCCHs can be averaged/filtered to improve the accuracy of channel estimation. Alternatively, when multiple repeating NR-PDCCHs are transmitted in the same beam, RSs to correspond to only one or part of the multiple NR-PDCCHs may be transmitted. In this case, the overhead of RSs can be reduced, and improved performance can be gained.

When multiple repeating NR-PDCCHs are transmitted using different beams, it is preferable to perform channel estimation and demodulation, independently, by using RSs corresponding to respective beams. Information as to whether the user terminal can average/filter the channel estimation values obtained from each RS, corresponding to the multiple repeating NR-PDCCHs, may be configured through higher layer signaling.

Alternatively, regardless of whether multiple repeating NR-PDCCHs are transmitted in the same beam or transmitted in different beams, the user terminal may perform channel estimation independently, without averaging/filtering the channel estimation values obtained from each RS corresponding to the multiple repeating NR-PDCCHs. As described above, even if a user terminal does not necessarily have to find information as to whether multiple NR-PDCCHs that repeat correspond to the same transmitting beam or correspond to different transmitting beams, and, still, adequate control is possible.

Now, envisaging future radio communication system (for example, 5G, NR, etc.), studies are underway to specify resources for a UL control channel (hereinafter also referred to as "PUCCH resources," "HARQ resources," etc.), by using higher layer signaling and L1 signaling, when delivery acknowledgement information (also referred to as "HARQ-ACK," "ACK/NACK," "A/N," etc.) in response to a DL channel (for example, DL data channel (PDSCH)) is transmitted using this UL control channel (for example, PUCCH).

To be more specific, envisaging future radio communication systems (for example, 5G, NR), studies are underway to configure a set (candidate) comprised of multiple PUCCH resources through higher layer signaling, and specify 1 PUCCH resource in the set using DCI. However, when an NR-PDCCH is monitored using multiple time and/or frequency resources (one or more beams) that vary (see, for example, FIG. 2 and FIG. 3), a user terminal may not be able to select, properly, which PUCCH resources should be used to transmit HARQ-ACKs.

So, the present inventors have worked on a method whereby, when NR-PDCCHs are monitored using multiple different time and/or frequency resources (one or more beams), a user terminal can properly select the PUCCH resources to use to transmit HARQ-ACKs, and arrived at the present invention.

Now, embodiments of the present invention will be described below in detail with reference to the accompanying drawings. Note that although the beamforming according to the herein-contained embodiments of the present invention presumes digital BF, analog BF and hybrid BF can be used as appropriate.

Also, in the following description of embodiments, beams that are used to transmit DL signals from a radio base station (also referred to as "transmitting beams," "Tx beams," etc.) will be primarily described. However, obviously, a "beam" as used hereinafter may refer to a beam pair link (BPL) formed with a Tx beam and an Rx beam.

Moreover, in the present embodiment, a "PUCCH resource" may be any resource as long as it is a resource for a UL control channel. A PUCCH resource may be, for example, a physical resource block (also referred to as a "PRB (Physical Resource Block)," a "resource block," etc.), to which uplink control information (UCI) to carry HARQ-ACK is mapped.

First Example

With a first example of the present invention, a case will be described below, in which, when an NR-PDCCH is monitored using multiple different time and/or frequency resources (one or more beams), PUCCH resources may be explicitly specified based on the value of a predetermined field (predetermined field value) included in DCI.

According to the first example, a user terminal receives information representing a set ("set information") that is comprised of multiple PUCCH resources, via higher layer signaling. The multiple PUCCH resources are respectively associated with predetermined field values in DCI. The user terminal selects PUCCH resources that are associated with (indicated by) predetermined field values in DCI, as PUCCH resources for transmitting HARQ-ACKs.

FIG. 4 is a diagram to show an example of how to select PUCCH resources, according to a first example of the present invention. In FIG. 4, predetermined field values "00," "01," "10," and "11" in DCI represent PUCCH resources #1 to #4, respectively. PUCCH resources #1 to #4 are configured by higher layer signaling. Note that these predetermined fields are not limited to being 2 bits.

For example, with reference to FIG. 4, when the user terminal detects a DCI including a predetermined field value "01," the user terminal transmits a HARQ-ACK using PUCCH resource #2 indicated by the predetermined field value "01."

When a single NR-PDCCH (single DCI) is divided into multiple pieces of encoded data (divisions of data), and the multiple divisions of data are transmitted in multiple time and/or frequency resources (one or more beams) that all vary (see, for example, FIG. 2), the user terminal recovers a single DCI based on one or more divisions of data detected in one or more beams. The user terminal can transmit an HARQ-ACK by using a PUCCH resource associated with a predetermined field value in the recovered DCI.

On the other hand, when multiple NR-PDCCHs (multiple DCIs) that schedule the same PDSCH are transmitted in multiple time and/or frequency resources (one or more beams) that all vary (see, for example, FIG. 3), the problem is that the user terminal does not know which DCI indicates the PUCCH resource the user terminal should use to transmit an HARQ-ACK in response to the PDSCH. In this case, the user terminal may select the PUCCH resource for transmitting the HARQ-ACK, by using one of the following methods (1) to (4):

(1) The user terminal may assume that a number of DCIs detected in the same search space all indicate the same PUCCH resource (that is, the predetermined field value is the same). In this case, the user terminal may transmit the HARQ-ACK by using the PUCCH resource indicated by one of the multiple DCIs. Note that, when the multiple DCIs do not indicate the same PUCCH resource, the user terminal may select the PUCCH resource to use to transmit the HARQ-ACK, based on a predetermined rule.

(2) The user terminal may transmit the HARQ-ACK by using the PUCCH resource indicated by the DCI that was detected last in the same search space.

(3) The user terminal may transmit the HARQ-ACK by using the PUCCH resource indicated by the DCI that was detected first in the same search space.

(4) The user terminal may transmit the HARQ-ACK by using the PUCCH resource indicated by any DCI that was detected in the same search space.

According to the first example, even when multiple NR-PDCCHs (multiple DCIs) are transmitted in varying time and/or frequency resources (one or more beams), a user terminal can still properly select the PUCCH resources to use to transmit HARQ-ACKs, based on predetermined field values included in DCIs detected.

Second Example

With a second example of the present invention, a case will be described below in which, when an NR-PDCCH is monitored using multiple different time and/or frequency resources (one or more beams), a user terminal derives, without an explicit command, the PUCCH resource to use to transmit an HARQ-ACK.

According to the second example of the present invention, a user terminal monitors (blind-decodes) candidate resources for one or more NR-PDCCHs (also referred to as "NR-PDCCH candidates," "PDCCH candidates," "candidates," etc.), which are transmitted using multiple time and/or frequency resources that all vary (one or more beams), to detect one or more DCIs. The user terminal derives one or more PUCCH resources based on information about the DCIs detected (detection information).

Here, the detection information may be information that is specific to each of one or more DCIs that are detected (and that is also referred to as "specific information" or "specific parameter," etc.) (first example of derivation), may be information that applies in common to one or more DCIs that are detected (also referred to as "common information," "common parameter" and the like) (second and third examples of derivation), or may be information about PDSCHs (PDSCH information) that are scheduled by one or more DCIs that are detected (fourth example of derivation).

Note that, according to the second example, when multiple different beams are used, multiple pieces of encoded data (divisions of data), which are obtained by dividing a single NR-PDCCH (DCI), may be transmitted (for example, FIG. 2), or multiple NR-PDCCHs (multiple DCIs) to schedule the same PDSCH may be transmitted (for example, FIG. 3). In the following, assume that "one or more NR-PDCCHs (or one or more DCIs)" include a single NR-PDCCH (or a single DCI) that is formed in multiple divisions of data, and multiple NR-PDCCHs (or multiple DCIs) that are repeatedly transmitted.

<First Example of Derivation>

According to a first example of derivation, one or more NR-PDCCHs, which are transmitted using multiple different time and/or frequency resources (one or more beams), are allocated in the same search space. The user terminal monitors (blind-decodes) a plurality of NR-PDCCH candidates in the search space and detects one or more DCIs. Based on information that is unique to each of one or more DCIs detected, the user terminal derives one or more PUCCH resources that correspond respectively to the one or more DCIs.

Here, each DCI-specific information (specific parameter) may be, for example, the index of the resource (resource index) where each DCI is detected. The resource index is, for example, at least one of a CCE index, an REG index, and an REG group index.

When multiple PUCCH resources are derived, the user terminal may transmit an HARQ-ACK by using a single PUCCH resource that is selected from the multiple PUCCH resources. The single PUCCH resource may be selected based on the implementation of the user terminal, or may be a PUCCH resource that is derived from the NR-PDCCH of the best channel state.

Alternatively, when multiple PUCCH resources are derived, the user terminal may transmit HARQ-ACKs by using these multiple PUCCH resources. To be more specific, the user terminal may map and transmit the same HARQ-ACK in these multiple PUCCH resources.

Figure 5A:
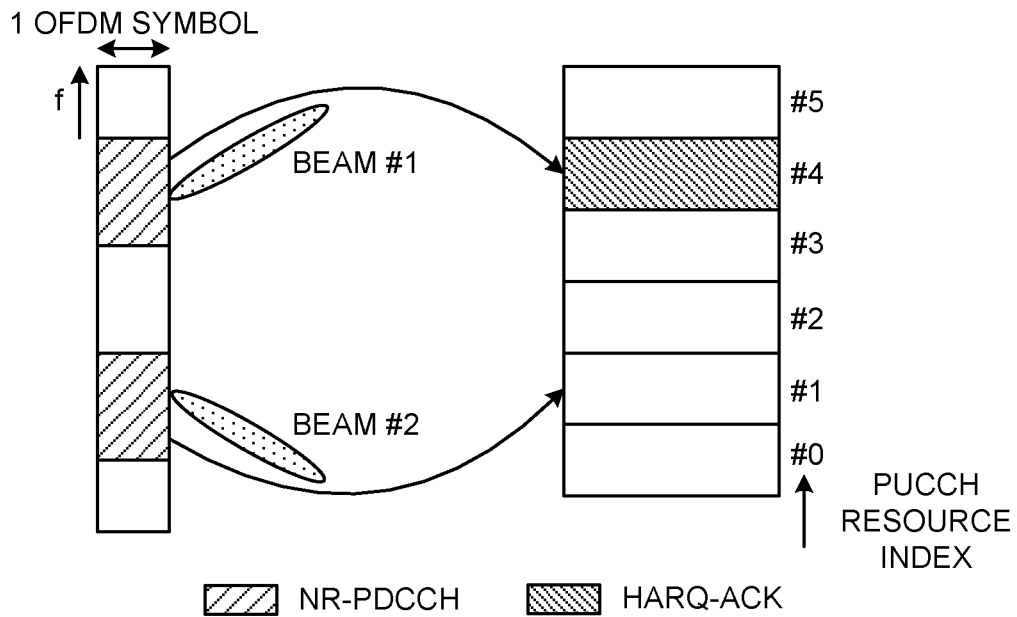
FIGS. 5A and 5B are diagrams to show a first example of deriving PUCCH resources according to a second example of the present invention.
Figure 5B:
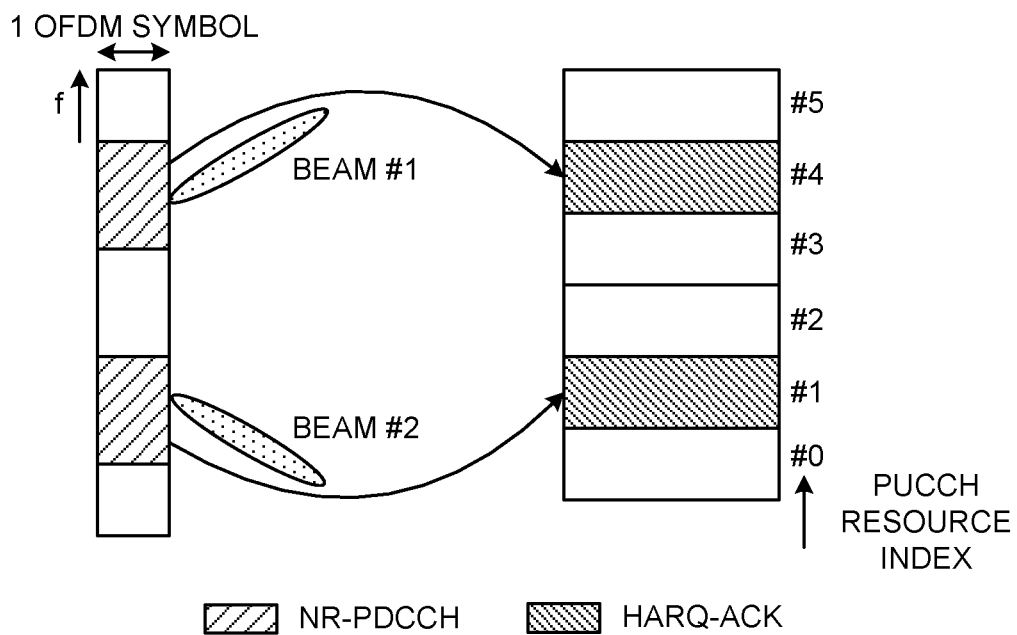

FIG. 5 are diagrams to show the first example of deriving PUCCH resources according to the second example. In FIGS. 5A and 5B, NR-PDCCHs of different beams #1 and #2 are allocated to 2 NR-PDCCH candidates in the same search space, respectively.

For example, in FIGS. 5A and 5B, a user terminal monitors (blind-decodes) the search space to detect the NR-PDCCHs of beams #1 and #2. The user terminal derives multiple PUCCH resources (here, PUCCH resources #4 and #1) based on information that is specific to each of the NR-PDCCHs of beams #1 and #2 (for example, at least one of CCE indices, REG indices and REG group indices).

As shown in FIG. 5A, when multiple PUCCH resources #1 and #4 are derived, the user terminal may transmit an HARQ-ACK by selecting a single PUCCH resource #4. For example, referring to FIG. 5A, the channel state of the NR-PDCCH of beam #1 is better than that of the NR-PDCCH of beam #2, so that PUCCH resource #4, which is derived based on the detection information pertaining to the NR-PDCCH of beam #1, may be selected. Note that which PUCCH resource is selected may be determined based on the implementation of the user terminal.

Alternatively, when, as shown in FIG. 5B, multiple PUCCH resources #1 and #4 are derived, the user terminal may transmit HARQ-ACKs by using both PUCCH resources #4 and #1 that are derived.

According to the first example of derivation, one or more PUCCH resources that correspond to one or more DCIs, respectively, are derived, based on information that is specific to each of one or more DCIs that are detected, so that a user terminal can select the PUCCH resources to use to transmit HARQ-ACKs, without increasing the overhead due to explicit commands from the radio base station.

<Second Example of Derivation>

According to a second example of derivation, one or more NR-PDCCHs (multiple divisions of data into which a single NR-PDCCH is divided, or multiple NR-PDCCHs), which are transmitted using multiple different time and/or frequency resources (one or more beams), are allocated in the same search space. The user terminal monitors (blind-decodes) a plurality of NR-PDCCH candidates in the search space and detects one or more DCIs (a single DCI or multiple DCIs recovered from one or more divisions of data). Based on information that applies in common to the one or more DCIs that are detected, the user terminal derives one or more PUCCH resources that correspond respectively to the one or more DCIs.

Here, the common information (common parameter) of one or more DCIs may be, for example, information that applies in common to resources in which the one or more DCIs are detected (for example, the index of a candidate set, which will be described later, or the lowest resource index in the candidate set). Alternatively, the common information may be configured by higher layer signaling (for example, RRC signaling).

With the second example of derivation, all NR-PDCCH candidates in a search space may be grouped into multiple candidate sets (also referred to as "NR-PDCCH candidate sets," "blind decoding (BD) candidate sets," and so forth, or may be referred to simply as "sets" and the like). Each candidate set may include one or more NR-PDCCH candidates. One or more NR-PDCCH candidates may be all associated with different beams.

When the radio base station transmits multiple NR-PDCCHs in multiple time and/or frequency resources that all vary (one or more beams), the radio base station may select a single candidate set, and map NR-PDCCHs of different beams to multiple NR-PDCCH candidates in the selected candidate set.

The multiple candidate sets are selected in advance based on predetermined rules, and the user terminal may identify multiple candidate sets according to rules that are set forth in advance. Alternatively, information about these multiple candidate sets (candidate set information) may be reported from the radio base station to the user terminal.

The user terminal may monitor (blind-decode) the multiple candidate sets and derive a single PUCCH resource to use to transmit an HARQ-ACK, based on information that applies in common to one or more DCIs that are detected (for example, the minimum CCE index in the candidate sets where the one or more DCIs were detected).

Figure 6:
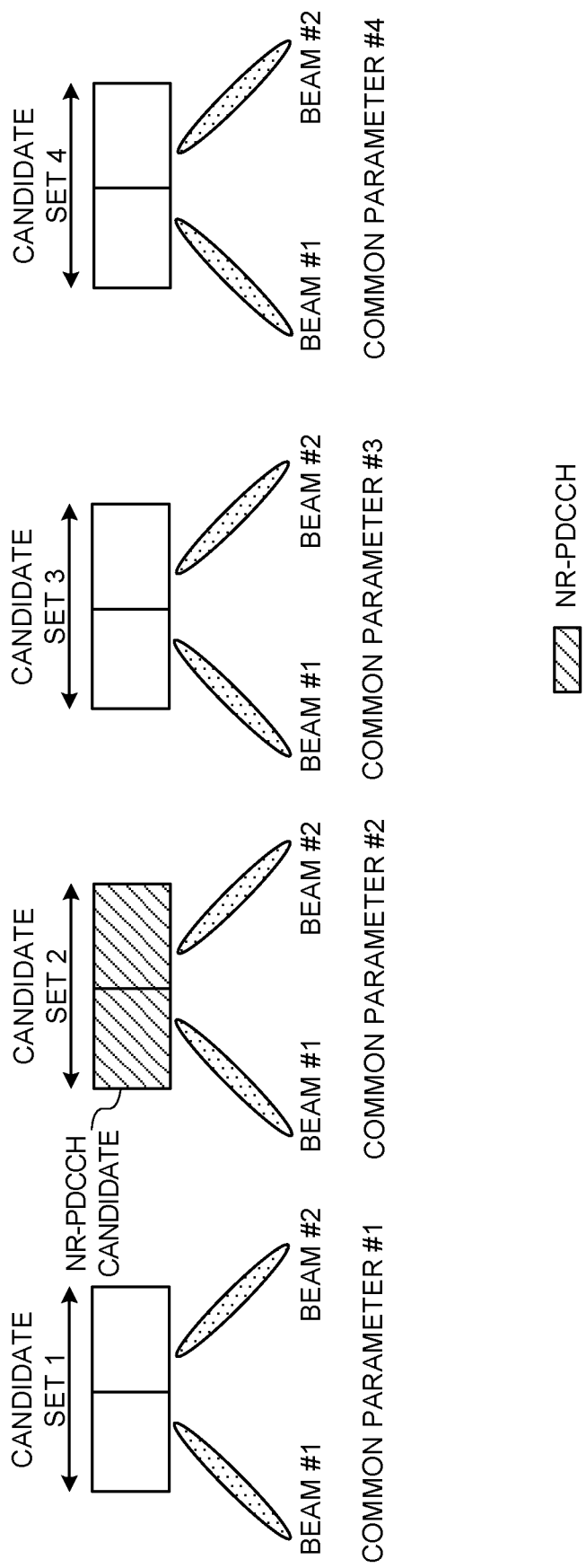
FIG. 6 is a diagram to show examples of multiple candidate sets according to the second example.

FIG. 6 is a diagram to show examples of multiple candidate sets according to the second example. For example, FIG. 6 shows a case where four candidate sets 1 to 4 are included in the same search space. With each candidate set, common information (common parameter) for multiple NR-PDCCHs in each candidate set is associated. For example, common parameters #1 to #4 may be the smallest resource indices (for example, CCE indices) in candidate sets 1 to 4, and may be configured by higher layer signaling.

In FIG. 6, each candidate set includes 2 NR-PDCCH candidates, and these 2 NR-PDCCH candidates are associated with different beams #1 and #2, respectively. In beams #1 and #2, multiple NR-PDCCHs that are duplicated (multiple DCIs) may be transmitted, or multiple divisions of data, into which a single NR-PDCCH is divided, may be transmitted.

In FIG. 6, the user terminal blind-decodes candidate sets 1 to 4 in the search space, and detects DCIs in the NR-PDCCH candidate corresponding to beam #1 and/or #2 in candidate set 2. The user terminal derives a single PUCCH resource based on common parameter #2 for candidate set 2, in which the DCI is detected. As mentioned earlier, this common parameter #2 may be the smallest resource index in candidate set 2, and may be configured by higher layer signaling.

Figure 7:
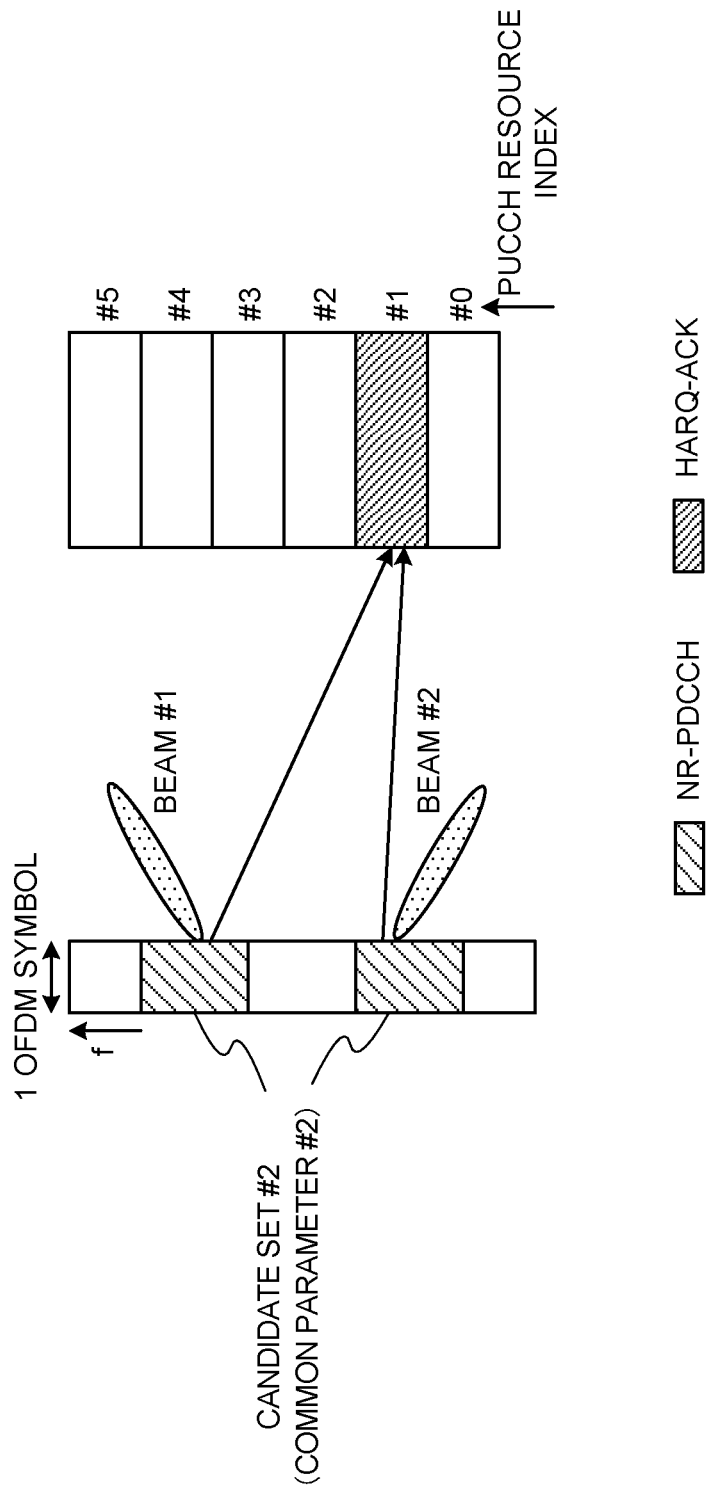
FIG. 7 is a diagram to show a second example of deriving PUCCH resources according to the second example.

FIG. 7 is a diagram to show a second example of deriving PUCCH resources according to the second example. In FIG. 7, the user terminal detects DCIs in NR-PDCCH candidates that correspond to beam #1 and/or #2 in candidate set 2.

As shown in FIG. 7, the user terminal derives single PUCCH resource #1 using common parameter #2 for beams #1 and #2 of candidate set 2. The user terminal transmits HARQ-ACKs using PUCCH resource #1.

According to the second example of derivation, a single PUCCH resource is derived based on information (common parameter) that applies in common to one or more DCIs that are detected, so that a user terminal can easily select the PUCCH resources to use to transmit HARQ-ACKs, without increasing the overhead due to explicit commands from the radio base station.

<Third Example of Derivation>

According to a third example of derivation, one or more NR-PDCCHs (multiple divisions of data into which a single NR-PDCCH is divided, or multiple NR-PDCCHs), which are transmitted using multiple different time and/or frequency resources (one or more beams), are allocated in multiple search spaces that vary. A user terminal monitors (blind-decodes) multiple NR-PDCCH candidates in these multiple search spaces, and detects one or more DCIs (a single DCI or multiple DCIs recovered from one or more divisions of data).

With the third example of derivation, based on information that applies in common to the one or more DCIs that are detected in multiple search spaces that vary, the user terminal derives one or more PUCCH resources that correspond respectively to the one or more DCIs. When DCIs are mapped to DL control channel candidates of the same index in these multiple search spaces, the common information may be the indices of resource units in which the DCI is detected (for example, CCE indices, REG indices or REG group indices).

The user terminal monitors (blind-decodes) multiple search spaces, and detects an NR-PDCCH (DCI) in at least one of the multiple search spaces. The user terminal derives a single PUCCH resource based on the index (for example, CCE index) of the resource unit in which the NR-PDCCH (DCI) is detected.

The user terminal assumes that multiple NR-PDCCHs (DCIs) are mapped to resource units of the same index in multiple different search spaces. Therefore, when multiple NR-PDCCHs (DCIs) are detected in multiple search spaces, the user terminal may derive PUCCH resources based on the index of any resource unit in which an NR-PDCCH is detected.

Figure 8:
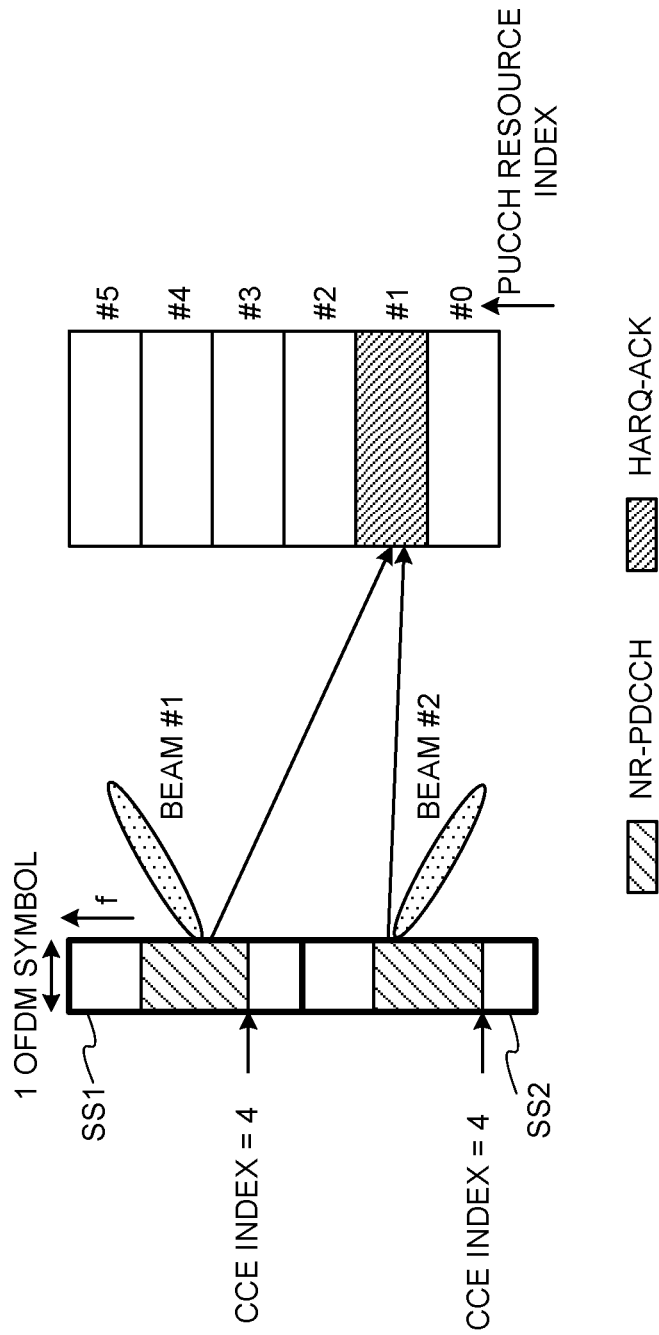
FIG. 8 is a diagram to show a third example of deriving PUCCH resources according to the second example.

FIG. 8 is a diagram to show a third example of deriving PUCCH resources according to the second example. For example, FIG. 8 assumes that the NR-PDCCH of beam #1 is mapped to the CCE of CCE index 4 in search space (SS) 1. Also, FIG. 8 assumes that the NR-PDCCH of beam #2 is mapped to the CCE of CCE index 4 in SS 2.

In FIG. 8, the user terminal detects NR-PDCCH in SS 1 and/or SS 2, and derives PUCCH resource #1 based on CCE index 4 in which the NR-PDCCH is detected. The user terminal transmits HARQ-ACKs using this PUCCH resource #1.

With the third example of derivation, a single PUCCH resource is derived based on information that applies in common to one or more DCIs that are detected in multiple search spaces that vary (for example, CCE index, REG index or REG group index), so that the user terminal can easily select the PUCCH resources to use to transmit HARQ-ACKs without increasing the overhead by an explicit command from the radio base station.

<Fourth Example of Derivation>

According to a fourth example of derivation, one or more NR-PDCCHs (multiple divisions of data into which a single NR-PDCCH is divided, or multiple NR-PDCCHs), which are transmitted using multiple different time and/or frequency resources (one or more beams), are allocated in the same search space. The user terminal derives a single PUCCH resource based on the information on PDSCHs (also referred to as "PDSCH information") scheduled by one or more DCIs that are detected by blind decoding.

Here, the PDSCH information may be, for example, information showing resources allocated to PDSCH (for example, starting PRB index) scheduled by one or more DCIs.

The user terminal assumes that the same PDSCH (PDSCH with same resource allocated) is scheduled, when one or more NR-PDCCHs are transmitted using multiple time and/or frequency resources that all vary (one or more beams). The user terminal monitors (blind-decodes) the same or multiple search spaces, and based on information about the PDSCHs that are scheduled by one or more DCIs detected, derives a single PUCCH resource.

Figure 9:
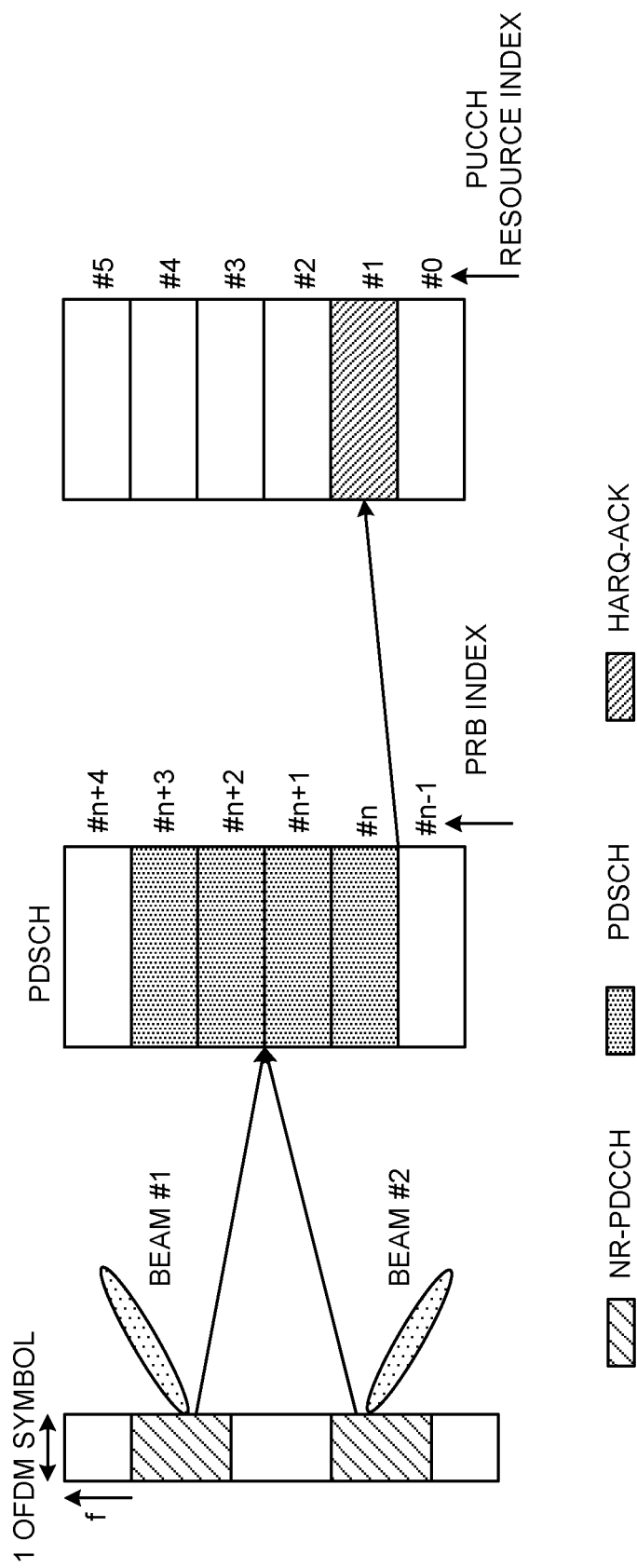
FIG. 9 is a diagram to show a fourth example of deriving PUCCH resources according to the second example.

FIG. 9 is a diagram to show a fourth example of deriving PUCCH resources according to the second example. In FIG. 9, as an example, the user terminal detects DCI corresponding to beam #1 and/or #2 in the same search space. As mentioned above, DCIs corresponding to beams #1 and #2 may be allocated in different search spaces.

As shown in FIG. 9, the user terminal detects the NR-PDCCH (DCI) corresponding to beam #1 and/or #2. The user terminal derives PUCCH resource #1 based on the first PRB index #n among PRBs #n to #n+3 allocated for PDSCH by the DCI. The user terminal transmits HARQ-ACKs using PUCCH resource #1.

In the fourth example of derivation, a single PUCCH resource is derived based on the information on the PDSCH scheduled by one or more DCIs that are detected, so that the user terminal can easily select the PUCCH resources to use to transmit HARQ-ACKs without increasing the overhead due to explicit commands from the radio base station.

(Radio Communication System)

Now, the structure of a radio communication system according to the present embodiment will be described below. In this radio communication system, communication is performed by using one or a combination of the radio communication methods according to the herein-contained embodiment of the present invention.

Figure 10:
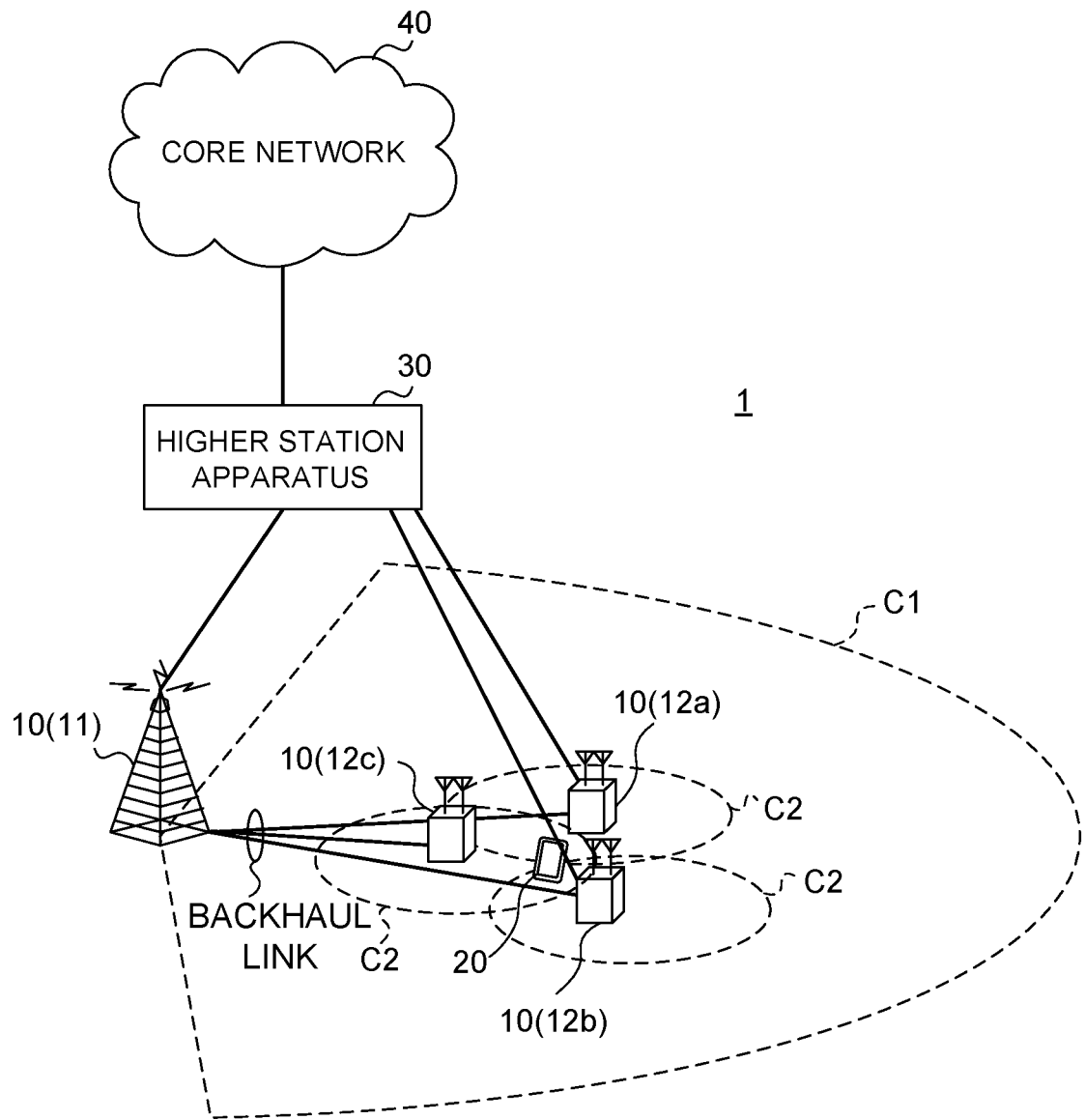
FIG. 10 is a diagram to show an exemplary schematic structure of a radio communication system according to the present embodiment.

FIG. 10 is a diagram to show an exemplary schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes 1 unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication is carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3 to 40 GHz) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a DL data channel (PDSCH (Physical Downlink Shared CHannel)), which is used by each user terminal 20 on a shared basis, a broadcast channel (PBCH (Physical Broadcast CHannel)), downlink L1/L2 control channels and so on are used as DL (Down-Link) channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," and/or the like) in response to the PUSCH is transmitted by the PHICH. The EPDCCH is frequency-division-multiplexed with the PDSCH and used to communicate DCI and so on, like the PDCCH. The PDCCH and/or the EPDCCH are also referred to as "DL control channel," "NR-PDCCH," and the like.

In the radio communication system 1, an UL data channel (PUSCH (Physical Uplink Shared CHannel)), which is used by each user terminal 20 on a shared basis, an UL control channel (PUCCH (Physical Uplink Control CHannel)), a random access channel (PRACH (Physical Random Access CHannel)) and so on are used as UL (UpLink) channels. User data and higher layer control information are communicated by the PUSCH. Also, downlink radio quality information (CQI (Channel Quality Indicator)), delivery acknowledgement information and so on are communicated by the PUCCH. By means of the PRACH, random access preambles for establishing connections with cells are communicated.

In the radio communication systems 1, the cell-specific reference signal (CRS), the channel state information reference signal (CSI-RS), the demodulation reference signal (DMRS), the positioning reference signal (PRS), the mobility reference signal (MRS) and so on are communicated as downlink reference signals. Also, in the radio communication system 1, the measurement reference signal (SRS (Sounding Reference Signal)), the demodulation reference signal (DMRS) and so on are communicated as UL reference signals. Note that the DMRS may be referred to as a "user terminal-specific reference signal (UE-specific Reference Signal)." Also, the reference signals to be communicated are by no means limited to these. In the radio communication system 1, synchronization signals (PSS and/or SSS), a broadcast channel (PBCH) and others are communicated in the downlink.

(Radio Base Station)

Figure 11:
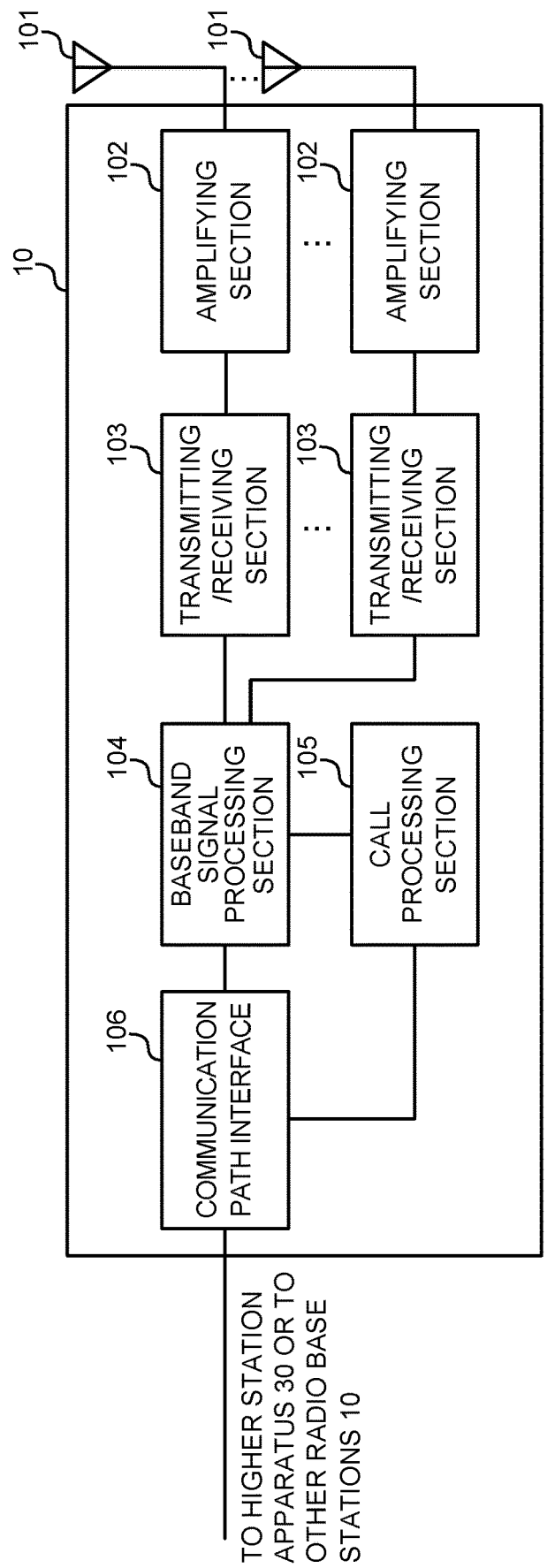
FIG. 11 is a diagram to show an exemplary overall structure of a radio base station according to the present embodiment.

FIG. 11 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 101 may be constituted by, for example, array antennas. In addition, the transmitting/receiving sections 103 are designed so that single-BF or multiple-BF operations can be used.

The transmitting/receiving sections 103 transmit a DL signal (for example, at least one of an NR-PDCCH/PDSCH, a mobility measurement signal, a CSI-RS, a DMRS, DCI and DL data) and receive a UL signal (for example, at least one of a PUCCH, a PUSCH, a measurement report, a beam report, a CSI report, UCI, an HARQ-ACK and UL data).

In addition, the transmitting/receiving sections 103 transmit at least one of information to represent a set (set information) that is comprised of multiple PUCCH resources and information about multiple candidate sets (candidate set information).

Figure 12:
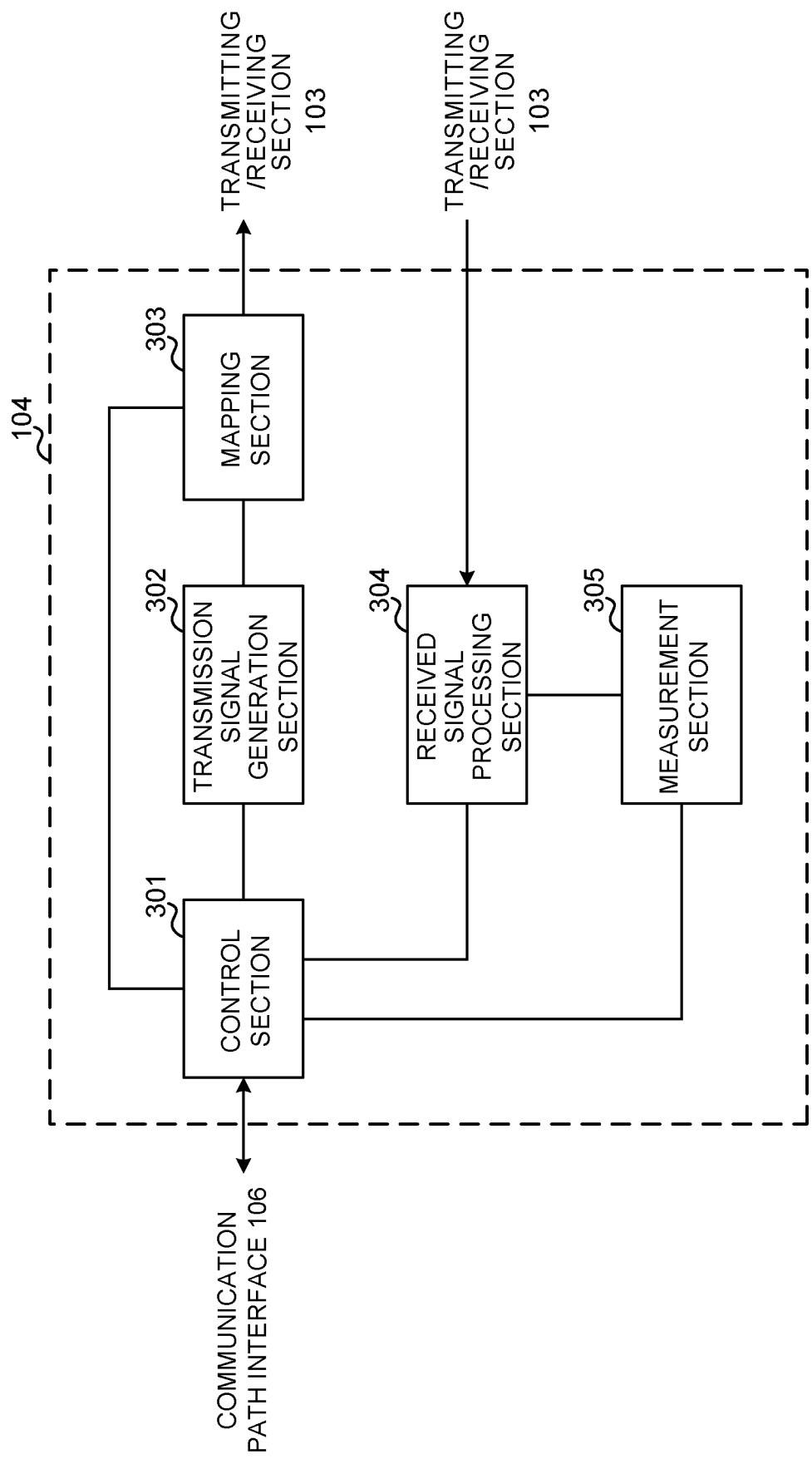
FIG. 12 is a diagram to show an exemplary functional structure of a radio base station according to the present embodiment.

FIG. 12 is a diagram to show an exemplary functional structure of a radio base station according to the present embodiment. Note that, although this example primarily shows functional blocks that pertain to characteristic parts of the present embodiment, the radio base station 10 has other functional blocks that are necessary for radio communication as well.

The baseband signal processing section 104 at least has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls scheduling of DL data channels and UL data channels, and controls generation and transmission of DCI that schedules DL data channels (DL assignments) and DCI that schedules UL data channels (UL grants).

The control section 301 may exert control so that Tx beams and/or Rx beams are formed using digital BF (for example, precoding) by the baseband signal processing section 104 and/or analog BF (for example, phase rotation) by the transmitting/receiving sections 103.

The control section 301 controls the beams (Tx beams and/or Rx beams) that are used to transmit and/or receive DL signals (for example, the NR-PDCCH/PDSCH). To be more specific, the control section 301 may control these beams based on CSI (at least one of the CRI, the CQI, the PMI and the RI) from the user terminals 20.

The control section 301 also controls transmission of one or more NR-PDCCHs using multiple time and/or frequency resources that all vary (one or more beams). In the multiple different time and/or frequency resources, a number of divisions of data, into which a single NR-PDCCH is divided, may be transmitted (for example, FIG. 2), multiple repeated NR-PDCCHs may be transmitted (for example, FIG. 3). Also, the control section 301 may control these multiple divisions of data or NR-PDCCHs to be mapped in the same search space, or mapped in multiple different search spaces.

Also, the control section 301 may exert control so that a set of PUCCH resources that can be used to transmit delivery acknowledgement information (HARQ-ACK) from the user terminal 20 is selected, and set information to show this set is transmitted via higher layer signaling. Also, the control section 301 may exert control so that DCI including a predetermined field value that specifies one of the multiple PUCCH resources is generated and transmitted.

The control section 301 controls the transmission of the DL signal (for example, PDSCH) based on the acknowledgement information (HARQ-ACK) from the user terminal 20.

The transmission signal generation section 302 generates DL signals based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

The transmission signal generation section 302 generates DCI (DL assignments, UL grants, etc.) based on commands from the control section 301, for example. Furthermore, a DL data channel (PDSCH) is subjected to an encoding process, a modulation process, a beamforming process (precoding process), based on coding rates, modulation schemes and others, which are determined based on, for example, CSI from each user terminal 20.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals transmitted from the user terminals 20. For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when feedback information (for example, CSI, HARQ-ACK, etc.) arrives from the user terminal, this feedback information is output to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), the SINR (Signal to Interference plus Noise Ratio), channel states and so on of the received signals. The measurement results may be output to the control section 301.

(User Terminal)

Figure 13:
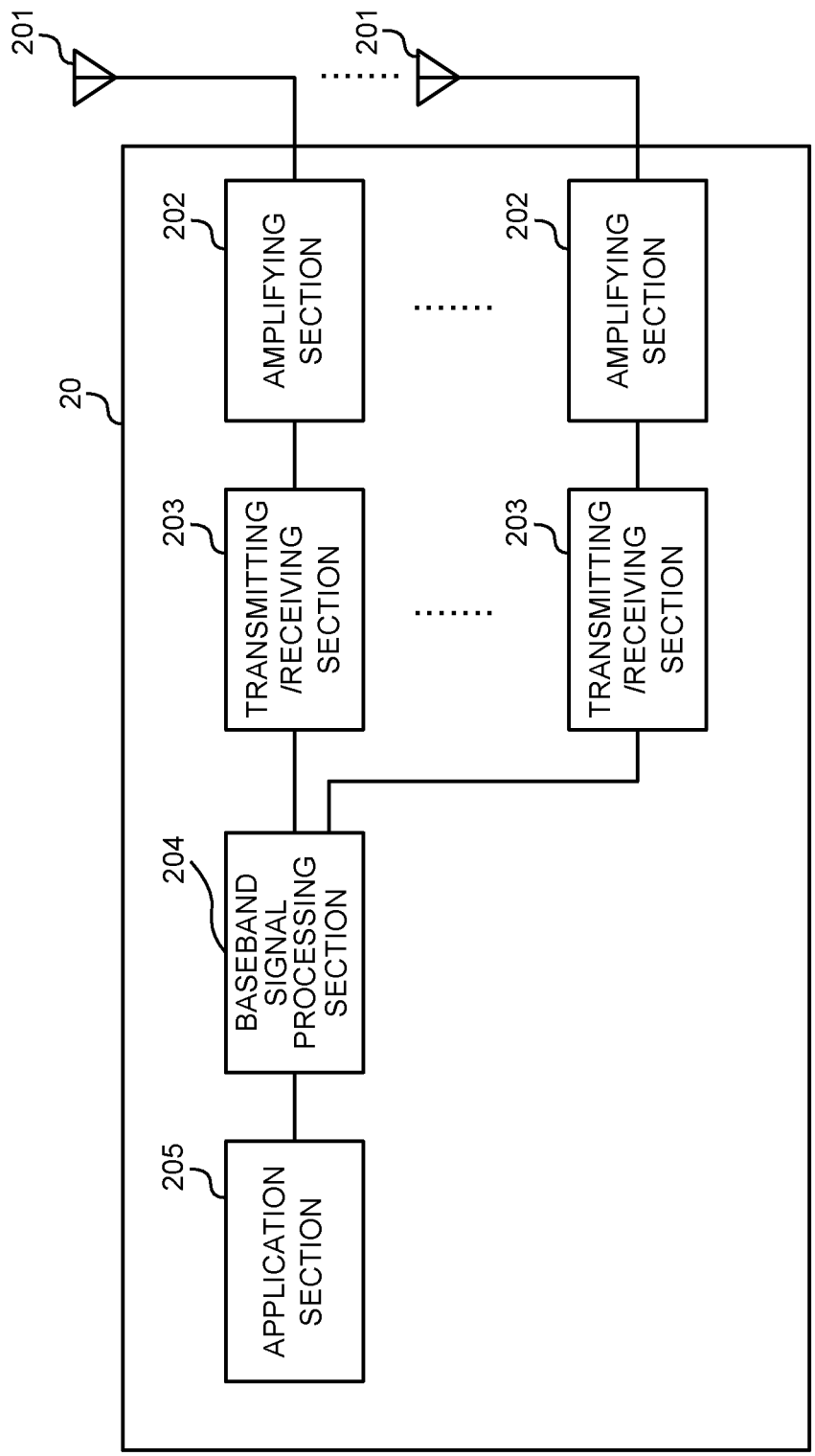
FIG. 13 is a diagram to show an exemplary overall structure of a user terminal according to the present embodiment.

FIG. 13 is a diagram to show an exemplary overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process and so on. Downlink user data is forwarded to the application section 205. The application section 205 performs processes related to higher layers above the physical layer and the MAC layer and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 may furthermore have an analog beamforming section that forms analog beams. The analog beamforming section may be constituted by an analog beamforming circuit (for example, a phase shifter, a phase shifting circuit, etc.) or analog beamforming apparatus (for example, a phase shifting device) that can be described based on general understanding of the technical field to which the present invention pertains. Furthermore, the transmitting/receiving antennas 201 may be constituted by, for example, array antennas. In addition, the transmitting/receiving sections 203 are structured so as to be capable of single-BF and multiple-BF operations.

The transmitting/receiving sections 203 receive a DL signal (for example, at least one of an NR-PDCCH/PDSCH, a mobility measurement signal, a CSI-RS, a DMRS, DCI, and DL data) and transmit a UL signal (for example, at least one of a PUCCH, a PUSCH, a measurement report, a beam report, a CSI report, UCI, HARQ-ACK and UL data).

In addition, the transmitting/receiving sections 203 receive at least one of information to represent a set (set information) that is comprised of multiple PUCCH resources and information about multiple candidate sets (candidate set information).

Figure 14:
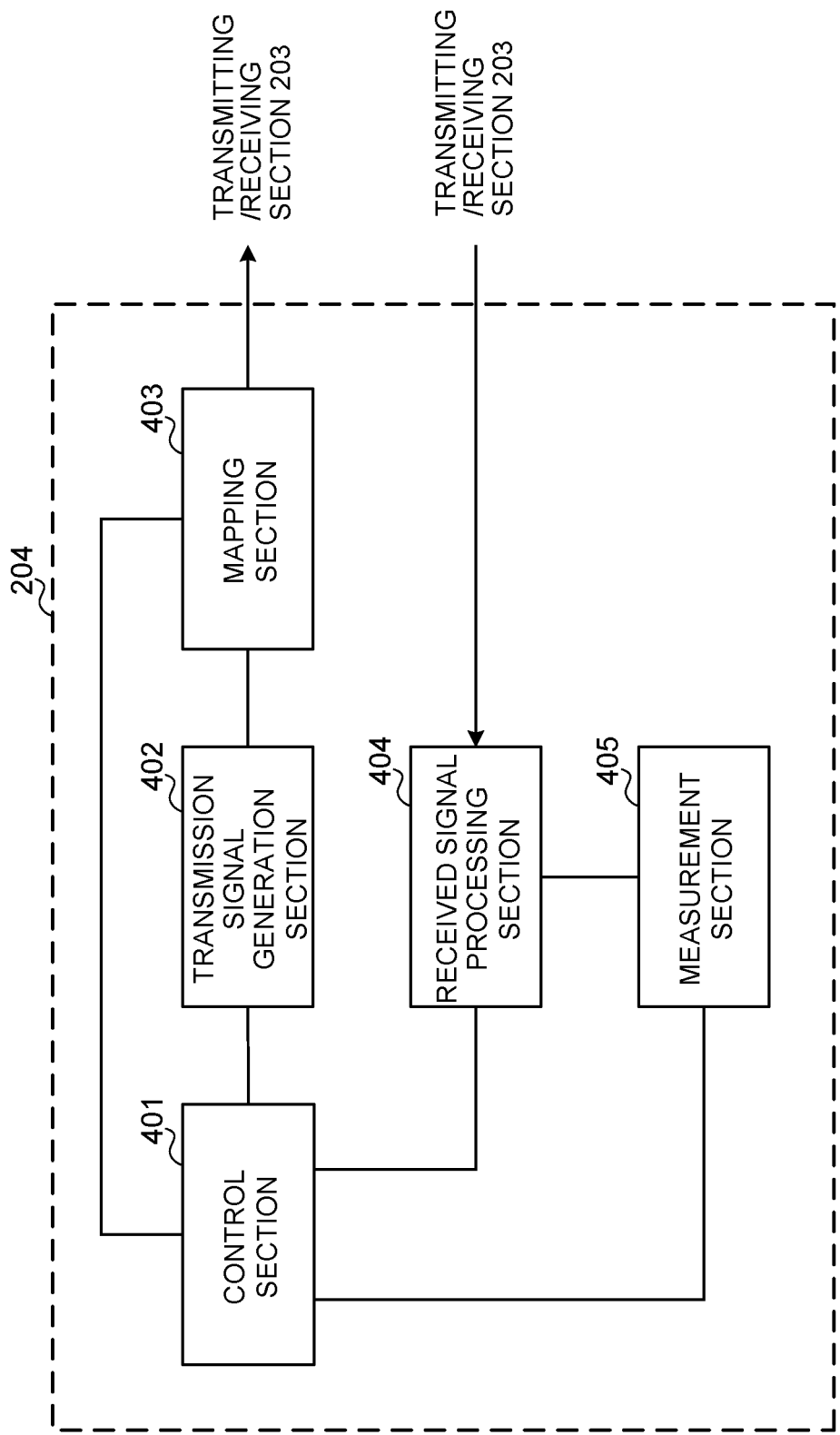
FIG. 14 is a diagram to show an exemplary functional structure of a user terminal according to the present embodiment.

FIG. 14 is a diagram to show an exemplary functional structure of a user terminal according to the present embodiment. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires DL control signals (DL control channels) and DL data signals (DL data channels) transmitted from the radio base station 10 from the received signal processing section 404. The control section 401 controls generation of UL control signals (for example, delivery acknowledgement information and so on) and/or UL data signals based on whether or not retransmission control is necessary, which is decided in response to DL control signals, DL data signals and so on.

The control section 401 may exert control so that transmitting beams and/or receiving beams are formed using the digital BF (for example, precoding) by the baseband signal processing section 204 and/or the analog BF (for example, phase rotation) by the transmitting/receiving sections 203.

The control section 401 controls the beams (Tx beams and/or Rx beams) that are used to transmit and/or receive DL signals (for example, the NR-PDCCH/PDSCH).

The control section 401 also controls monitoring (blind decoding) of one or more NR-PDCCHs, which are transmitted using multiple different time and/or frequency resources (one or more beams). To be more specific, the control section 401 monitors the candidate resources for the one or more NR-PDCCHs (also referred to as "NR-PDCCH candidates," "PDCCH candidates," "candidates," etc.) and detects one or more DCIs. The one or more DCIs (multiple divisions of data that make up a single DCI, or multiple DCIs that recur) may be allocated to different candidate resources in the same search space, or allocated to candidate resources in different search spaces, as described above.

The control section 401 also controls the receipt of PDSCHs based on one or more DCIs that are detected. The one or more DCIs may schedule PDSCHs to be allocated to the same resource.

Also, the control section 401 may control the transmission of delivery acknowledgement information (HARQ-ACK) in response to the PDSCHs. To be more specific, the control section 401 controls HARQ-ACK generation based on the decoding results of PDSCHs. Also, the control section 401 may select the PUCCH resources to use to transmit HARQ-ACK based on one or more DCIs that are detected.

For example, the control section 401 may select the resources for the UL control channel based on a predetermined field value included in the DCI (see first example and FIG. 4). Note that PUCCH resources configured in advance by higher layer signaling are associated with each value of the predetermined field of DCI.

Also, the control section 401 may derive one or more PUCCH resources corresponding respectively to the one or more NR-PDCCHs based on information that is specific to one or more NR-PDCCHs in which DCI was detected (also referred to as "specific information" or "specific parameters") (see second example, first example of derivation, and FIG. 5).

Also, the control section 401 may derive a single PUCCH resource based on information that applies in common to one or more NR-PDCCHs in which DCI was detected (also referred to as "common information," "common parameter" and the like) (see second example, and second and third examples of derivation).

When one or more DCIs corresponding to multiple time and/or frequency resources (one or more beams) that vary are mapped in the same search space, the above common parameter may be information that applies in common to the resources in which the one or more DCIs were detected, or may be configured by higher layer signaling (for example, RRC signaling) (see second example of derivation, FIG. 6 and FIG. 7).

When one or more DCIs corresponding to multiple time and/or frequency resources (one or more beams) that vary are mapped into multiple search spaces, the common information may be the index of the resource unit (for example, CCE index, REG index or REG group index) in which each DCI was detected in each search space (see the third example of derivation and FIG. 8).

Also, the control section 401 may derive a single PUCCH resource based on information (PDSCH information) about the PDSCH scheduled by the DCI (second example, fourth derivation example, see FIG. 9).

The transmission signal generation section 402 generates UL signals (UL control signals, UL data signals, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

The transmission signal generation section 402 generates feedback information (for example, at least one of an HARQ-ACK, CSI and a scheduling request) based on, for example, command from the control section 401. Also, the transmission signal generation section 402 generates uplink data signals based on commands from the control section 401. For example, when a UL grant is included in a DL control signal that is reported from the radio base station 10, the control section 401 commands the transmission signal generation section 402 to generate an uplink data signal.

The mapping section 403 maps the UL signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, DL signals (DL control signals, DL data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals, the signals after the receiving processes and so on, to the measurement section 405.

The measurement section 405 conducts measurements with respect to the received signals. For example, the measurement section 405 performs measurements using mobility measurement signals and/or CSI-RS resources transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, reception SINR), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 15:
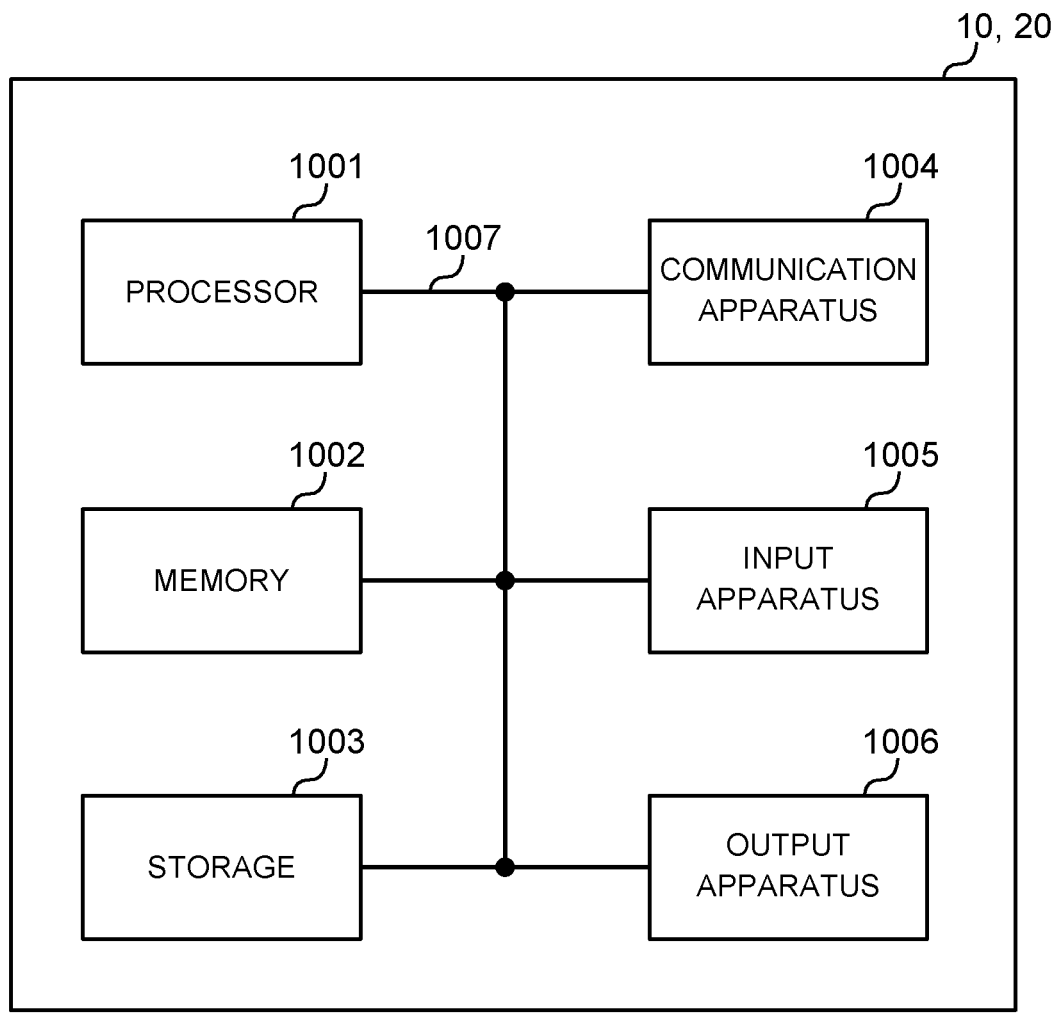
FIG. 15 is a diagram to show an exemplary hardware structure of a radio base station and a user terminal according to the present embodiment.

For example, the radio base station, user terminals and so on according to embodiments of the present invention may function as a computer that executes the processes of the radio communication method of the present invention. FIG. 15 is a diagram to show an exemplary hardware structure of a radio base station and a user terminal according to an embodiment of the present invention. Physically, the above-described radio base stations 10 and user terminals 20 may be formed as computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, 1 subframe may be referred to as a "transmission time interval" (TTI), or a plurality of consecutive subframes may be referred to as a "TTI," or 1 slot or minislot may be referred to as a "TTI." That is, a subframe and/or a TTI may be a subframe (1 ms) in existing LTE, may be a shorter period than 1 ms (for example, 1 to 13 symbols), or may be a longer period of time than 1 ms. Note that the unit to represent the TTI may be referred to as a "slot," a "minislot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when 1 slot or 1 minislot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "mini slot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be 1 slot, 1 minislot, 1 subframe or 1 TTI in length. 1 TTI and 1 subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, 1 RE may be a radio resource field of 1 subcarrier and 1 symbol.

Note that the structures of radio frames, subframes, slots, minislots, symbols and so on described above are merely examples. For example, configurations pertaining to the number of subframes included in a radio frame, the number of slots included in a subframe or a radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols, chips and so on, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may b e stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by 1 bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a processor that monitors candidate resources of a plurality of physical downlink (DL) control channels (PDCCHs) transmitted in multiple different time and/or frequency resources, and detects the plurality of PDCCHs allocated in different search spaces, the plurality of PDCCHs scheduling a same physical downlink shared channel (PDSCH); and
   a transmitter that transmits delivery acknowledgment information in response to the PDSCH by using a physical uplink (UL) control channel (PUCCH),
   wherein the processor selects a single resource for the PUCCH based on information, about resources of the plurality of PDCCHs, that applies in common to the plurality of PDCCHs and performs a control to transmit the delivery acknowledgement information by the single resource, and
   the plurality of PDCCHs is a PDCCH repetition.

2. The terminal according to claim 1, wherein the processor monitors the candidate resources of the plurality of PDCCHs transmitted in the multiple different time and/or frequency resources in a plurality of transmitting (Tx) beams.

3. A radio communication method for a terminal, comprising:
   monitoring candidate resources of a plurality of physical downlink (DL) control channels (PDCCHs) transmitted in multiple different time and/or frequency resources, and detecting the plurality of PDCCHs allocated in different search spaces, the plurality of PDCCHs scheduling a same physical downlink shared channel (PDSCH);
   transmitting delivery acknowledgment information in response to the PDSCH by using a physical uplink (UL) control channel (PUCCH),
   selecting a single resource for the PUCCH based on information, about resources of the plurality of PDCCHs, that applies in common to the plurality of PDCCHs, and
   performing a control to transmit the delivery acknowledgement information by the single resource,
   wherein the plurality of PDCCHs is a PDCCH repetition.

4. A base station communicating with a terminal, the base station comprising:
   a transmitter that transmits a plurality of physical downlink (DL) control channels (PDCCHs) in multiple different time and/or frequency resources in candidate resources of the plurality of the PDCCHs, wherein the PDCCHs are allocated in different search spaces and schedule a same physical downlink shared channel (PDSCH); and
   a processor that indicates transmitting delivery acknowledgment information in response to the PDSCH by using a physical uplink (UL) control channel (PUCCH),
   wherein a single resource for the PUCCH is selected by the terminal based on information, about resources of the plurality of PDCCHs, that applies in common to the plurality of PDCCHs and performs a control to receive the delivery acknowledgment information by the single resource, and
   the plurality of PDCCHs is a PDCCH repetition.

5. A radio communication system comprising a terminal and a base station, wherein:
   the terminal comprises:
      a processor of the terminal that monitors candidate resources of a plurality of physical downlink (DL) control channels (PDCCHs) transmitted in multiple different time and/or frequency resources, and detects the plurality of PDCCHs allocated in different search spaces, the plurality of PDCCHs scheduling a same physical downlink shared channel (PDSCH); and
      a transmitter of the terminal that transmits delivery acknowledgment information in response to the PDSCH by using a physical uplink (UL) control channel (PUCCH),
      wherein the processor selects a single resource for the PUCCH based on information, about resources of the plurality of PDCCHs, that applies in common to the plurality of PDCCHs and performs a control to transmit the delivery acknowledgement information by the single resource, and
   the base station comprises:
      a transmitter of the base station that transmits the plurality of PDCCHs; and
      a processor of the base station that indicates transmitting the delivery acknowledgment information by using the PUCCH, and
   wherein the plurality of PDCCHs is a PDCCH repetition.

* * * * *